June 4, 1929.        C. A. SWANSON        1,716,196
MOUSE TRAP
Filed Oct. 10, 1928
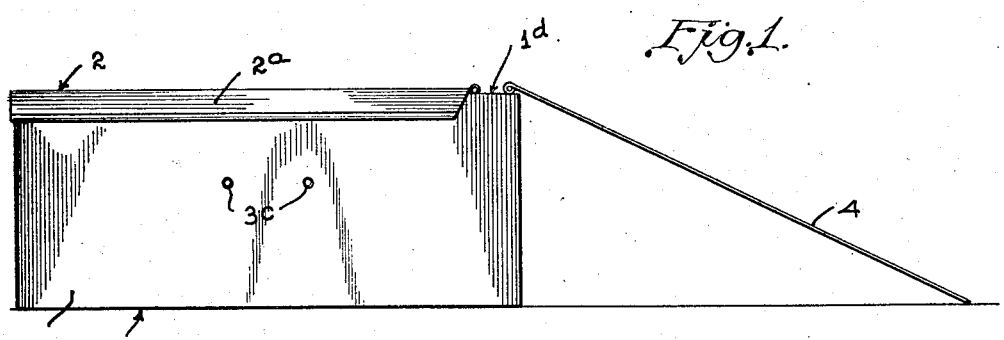
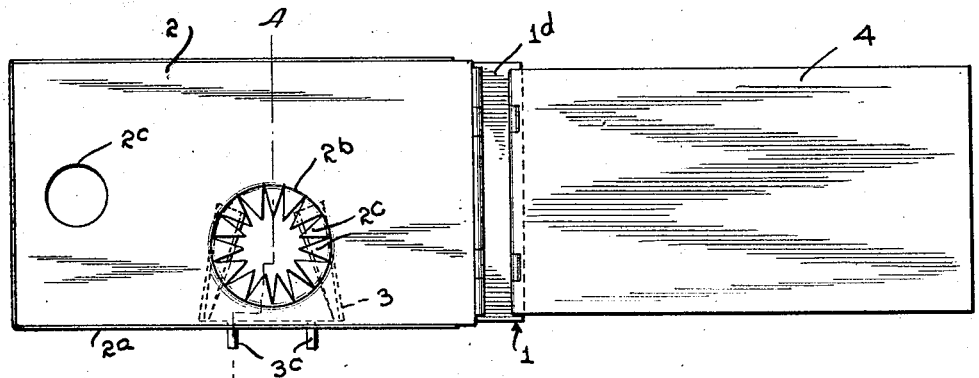
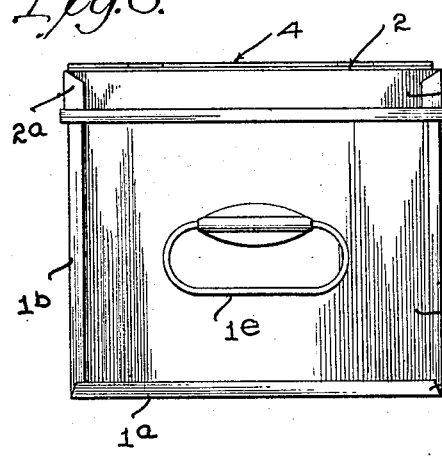
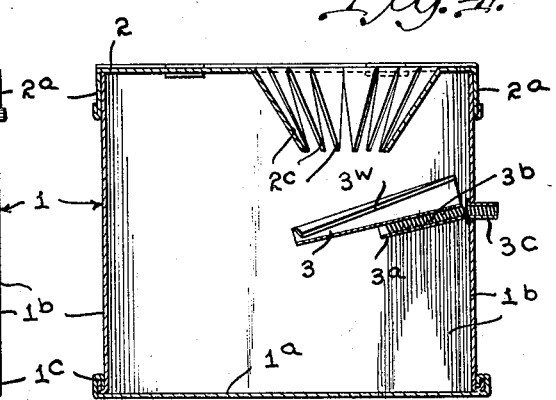
Inventor:
CARL A. SWANSON.
By Ralph L. Turoff atty.

Patented June 4, 1929.

1,716,196

UNITED STATES PATENT OFFICE.

CARL A. SWANSON, OF ALDEN, PENNSYLVANIA.

MOUSETRAP.

Application filed October 10, 1928. Serial No. 311,653.

This invention relates to traps for animals such as rodents or the like, and more especially to a trap especially designed for indoor use.

It is a major purpose of the present invention to provide a mouse or rat trap designed for use within homes, buildings, ships, mines or the like, which will capture the rodent and retain the same against escape without any possibility of harm or injury thereto.

It is a further object of the present invention to provide a trap of the class set forth which will be extremely simple in operation and which will permit the ready extermination of any rodent captured therein.

It is a still further object of the invention to provide in a trap of the class set forth, bait retaining means, which while insuring the attraction and subsequent capture of the rodent will not permit of the eating of any of the bait by the animal either before or after capture, thus obviating any necessity for repeatedly rebaiting the trap.

It is a still further object of the present invention to provide a trap so constructed that it may be readily and conveniently carried from the place where it may be set to any place where it is desired to exterminate the captured rodent without any possibility of escape of the captured animal or of damage as by biting or the like to the person carrying the trap.

Traps as are at present in wide use, are designed to generally capture and kill the rodent therein; this being accomplished either by poisoned bait within the trap or by means operable upon the springing of the trap to so injure the captured rodent as to insure his death. This practice embodies numerous objectionable features, chief among which are the facts that upon the death of the rodent dangerous and objectionable odors will exist until the removal thereof and further violent killing of the rodent results in filth and bloodshed which will mar the spot where the trap may be placed.

This type of trap is further objectionable from the humanitarian viewpoint in that it, through injury to the captured rodent resulting in the death thereof, provides a needlessly inhuman and torturous treatment of the captive animal. It is accordingly a major object of the present invention to provide a novel trap which will merely insure the capture of the rodent, the extermination thereof being an operation entirely separated from the operation of the trap.

It is a further object of the invention to provide a trap of the class set forth which will be simple in operation; which may be easily baited; which will be readily and conveniently portable; and which will be inexpensive to manufacture. Further objects of the invention will be hereinafter more fully set forth.

The accompanying drawing illustrates one practical mouse trap embodying the present invention which will be described in detail to enable others to understand and use the same, but the invention is not considered restricted to the specific construction shown in the drawing and reference is therefore had to the claims for summaries of the essentials of the invention and of the novel features of construction and of the novel combinations of parts for all of which protection is desired.

In the drawings:

Figure 1 is a side elevational view of the entire trap, illustrating the same in open or baited position.

Figure 2 is a top plan view of the entire trap also illustrating the same in baited position.

Figure 3 is an end view illustrating the trap in closed position.

Figure 4 is a transverse sectional view taken on the line 4—4 of Figure 2.

As shown in the drawings, the novel trap comprises a box-like structure which may be of any desired size, conformation, and material. Preferably the trap, indicated generally at 1, is substantially rectangular in conformation, including a bottom wall $1^a$ and side and end walls $1^b$. At the meeting edges of the said walls a water tight joint $1^c$ is preferably provided. If desired the trap might be formed from a single sheet of metal so conformed as to be capable of being set up in a unitary structure.

The trap is provided adjacent one end thereof with a relatively narrow top wall $1^d$, (see Figure 2 of the drawings), to which is designed to be hingedly attached a cover member 2. Preferably the cover member includes downwardly depending side walls $2^a$ on three sides thereof adapted to snugly fit against the side walls of the trap proper whereby a relatively tight joint is effected therebetween.

The cover 2 is provided with an aperture $2^b$ positioned adjacent the center and at one side thereof, directly beneath which is adapted to be positioned the bait retaining pan as will be hereinafter more fully described. This aperture includes downwardly depending converging walls which take a frusto-conical conformation; the said walls being serrated to provide a plurality of pointed stringers $2^c$ which effectually prevent the escape through the aperture of any rodents which may have entered the trap, as is well known in the art.

Directly beneath the aperture $2^b$ is mounted the bait retaining pan or member 3 which is yieldably secured to the adjacent side wall of the trap proper in any desired manner. Preferably the bait retaining member has rigidly secured therebeneath a pair of tubular members $3^a$ in which are fixedly secured resilient members or coil springs $3^b$ the extremities of which project beyond the said tubular members, and beyond the bait retaining pan.

The adjacent side wall $1^b$ of the trap proper is provided with a pair of spaced small apertures in which are fixedly mounted a pair of tubular supports $3^c$ designed to receive therein the extremities of the coil springs $3^a$. It will be obvious that through the above described resilient or yieldable mounting of the bait retaining member 3, any pressure thereupon, as by a rodent or the like after the bait, will result in the depression thereof and the dropping of the rodent into the trap proper from whence it will be impossible for the captured animal to escape.

The cover 2 is provided with a preferably centrally located second aperture $2^c$ designed for use in the extermination of the captured animals as by flooding of the trap or the like.

Pivotally secured to the narrow top wall $1^d$ is an auxiliary cover member 4 which is designed to be turned down when the trap is in set or baited position, and assumes the angular position indicated in Figure 1 of the drawings, thus forming an inclined platform on which the rat or mouse travels in an effort to reach the bait within the trap. This auxiliary cover member is further designed to provide a supplementary cover for the trap when it is desired to remove the trap after capture of a rodent or rodents therein, to a place where the captured animals may be conveniently exterminated.

The end walls of the trap proper are preferably provided with suitable handles $1^e$ whereby the trap may be more conveniently carried. These handles further serve the purpose of providing securing means by which the trap may be fastened to any desired spot in any preferred manner when the trap is set. This is particularly desirable where the trap is of a large size and designed for use in the capture of relatively large rats such as abound in ships, mines, or the like.

The bait retaining member may be of any desired formation and may include any type of bait retaining means thereon. Preferably the member comprises a pan 3 including angularly disposed overhanging walls $3^w$ whereby the bait is designed to be retained upon the pan by the said walls. Obviously any manner of bait might be employed in the operation of the trap.

The operation of the trap is extremely simple. Bait is first placed upon the retaining pan 3 and the cover 2 is then closed; the platform 4 being in inclined position and the trap placed where desired. After the capture of one or more animals therein, the trap may be removed to any convenient place where extermination of the captive animals is had preferably through the flooding of the trap through the aperture $2^c$.

If desired any other form of extermination might be as conveniently employed. For example, after the trap has been removed to the place where such extermination is desired, poisoned food might be inserted therein through the aperture $2^c$ and thereby instantaneous death of the captured animals might be had. It will be noted that inasmuch as the bait retaining pan is positioned directly beneath the aperture $2^b$, no flooding of the trap or insertion of food or other exterminating means should be had through the said aperture $2^b$ in order that no damage be done to the bait retaining member.

There has thus been described a novel trap of the class set forth which is extremely simple in operation; which will in no manner injure the captured animals whereby filth, disease or foul odors will result; which may be easily baited and in which the bait cannot be obtained by lured animals either before, during or after capture; which is readily and conveniently portable; and which is inexpensive of manufacture.

The invention having thus been described, what is claimed is:—

1. A trap of the class described comprising in combination, a box-like member including bottom, side and end walls and a narrow transverse top wall, a cover member hingedly secured to the inner edge of the said top wall and an auxiliary cover member hingedly secured to the outer edge of the said top wall, a bait retaining member within the trap, the said bait retaining member comprising a flat pan having inturned angularly disposed overhanging walls, means for resiliently securing the bait retaining member to one of the side walls of the trap, an aperture in the cover member disposed directly above the bait retaining member and a second aperture in the said cover member whereby an exterminating agent may be introduced within the trap.

2. A trap of the class set forth, comprising in combination, a box-like member including bottom, side and end walls and a narrow transverse top wall, a cover member hingedly secured to the inner edge of the top wall and an auxiliary cover member hingedly secured to the opposite edge thereof, a bait retaining member comprising inturned angularly disposed overhanging walls mounted within the trap, means for yieldably securing the said bait retaining member to one of the side walls of the trap the said means comprising tubular members fixedly secured to the under side of the bait retaining member, coil springs disposed within the said tubular members so as to have the extremities thereof overhanging the bait retaining member, tubular members mounted in the side wall of the trap in opposite relationship to the aforementioned tubular members, whereby the extremities of the coil springs may be disposed within the side wall of the trap, an aperture in the cover member disposed directly above the bait retaining member, and a second aperture in the said cover member whereby an exterminating agent may be introduced into the trap, substantially as described.

3. In a trap of the class set forth, a bait retaining member adapted to be resiliently mounted within the trap, the said member including a relatively flat pan and angularly disposed overhanging walls, a pair of tubular members fixedly secured to the underside of the bait retaining member, a pair of coil springs mounted within the tubular members so that the extremities of the coil springs overhang the same and project beyond the bait retaining pan, and a pair of tubular members mounted within the side wall of the trap and adapted to receive the extremities of the coil springs therein, whereby the bait retaining member is yieldably secured to the side wall of the trap.

In testimony whereof he affixes his signature.

CARL A. SWANSON.